US008813960B2

(12) United States Patent  
Fjelland

(10) Patent No.: US 8,813,960 B2
(45) Date of Patent: Aug. 26, 2014

(54) LATCH SYSTEM FOR CONTAINERS

(75) Inventor: Douglas J. Fjelland, Medford, OR (US)

(73) Assignee: Becklin Holdings, Inc., Reno, NV (US)

( * ) Notice: Subject to any disclaimer, the term of this patent is extended or adjusted under 35 U.S.C. 154(b) by 443 days.

(21) Appl. No.: 12/848,371

(22) Filed: Aug. 2, 2010

(65) Prior Publication Data

US 2012/0024739 A1  Feb. 2, 2012

(51) Int. Cl.
*B65D 21/00* (2006.01)
*F16B 45/02* (2006.01)
*B65D 21/02* (2006.01)
*F16B 1/00* (2006.01)

(52) U.S. Cl.
CPC .............. *F16B 45/02* (2013.01); *B65D 21/023* (2013.01); *F16B 1/00* (2013.01)
USPC .......... 206/503; 206/511; 220/4.26; 220/4.27

(58) Field of Classification Search
USPC ......... 206/503, 508, 509, 511, 512; 220/4.26, 220/4.27
See application file for complete search history.

(56) References Cited

U.S. PATENT DOCUMENTS

| | | | |
|---|---|---|---|
| 491,865 A * | 2/1893 | Wynn | 220/8 |
| 1,142,932 A * | 6/1915 | Clark | 206/541 |
| 1,665,238 A * | 4/1928 | Turan | 220/4.27 |
| 3,144,016 A * | 8/1964 | Basci | 126/265 |
| 3,259,263 A * | 7/1966 | Wei | 220/4.27 |
| 3,369,691 A * | 2/1968 | Wei | 220/4.27 |
| 3,384,259 A * | 5/1968 | Hoffstadt | 220/4.27 |
| 3,828,964 A * | 8/1974 | Bonnot | 220/1.5 |
| 4,109,789 A * | 8/1978 | Fattori et al. | 206/404 |
| 4,655,360 A | 4/1987 | Juhanson | |
| 4,760,921 A * | 8/1988 | Licari | 206/504 |
| 4,901,380 A * | 2/1990 | Smith | 4/596 |
| 5,086,926 A * | 2/1992 | Paige et al. | 206/542 |
| 5,203,494 A | 4/1993 | Blomfield | |
| 5,461,755 A | 10/1995 | Hardigg et al. | |
| 5,564,583 A * | 10/1996 | Kelley et al. | 220/23.83 |
| 5,671,856 A * | 9/1997 | Lisch | 220/4.27 |
| 5,699,925 A * | 12/1997 | Petruzzi | 220/4.27 |
| 5,769,230 A | 6/1998 | Koefelda | |
| 6,024,223 A * | 2/2000 | Ritter | 206/600 |
| 6,085,467 A * | 7/2000 | Packrall et al. | 52/36.1 |
| 6,186,345 B1 | 2/2001 | Robertson | |
| 6,237,758 B1 | 5/2001 | Hsu | |
| 6,273,258 B1 * | 8/2001 | Piacenza | 206/503 |
| RE37,518 E | 1/2002 | Hardigg et al. | |
| 6,457,599 B1 | 10/2002 | Apps et al. | |
| 6,715,627 B1 * | 4/2004 | Bonner et al. | 220/4.27 |
| 6,840,378 B2 * | 1/2005 | Toguchi | 206/503 |
| 6,851,566 B1 * | 2/2005 | Bonner | 220/4.27 |

(Continued)

*Primary Examiner* — Fenn Mathew
*Assistant Examiner* — Christopher McKinley
(74) *Attorney, Agent, or Firm* — Lowe Graham Jones PLLC

(57) ABSTRACT

A latch system for stacked containers includes a plurality of bosses and a latch mechanism. The bosses are coupled to each of the stack containers and may include a pivot boss, a storage boss and a latch boss. The latch mechanism includes a pivot end portion, a flexible mid portion and a latch end portion. The pivot end portion is placed onto the pivot boss to allow rotation of the latch mechanism there about. In one embodiment, the pivot end portion includes a rounded inner diameter to permit both in-plane and out-of-plane rotation of the latch mechanism relative to the container. The latch end portion biasly engages either the storage boss of the same container or the latch boss of another container.

17 Claims, 3 Drawing Sheets

(56) References Cited

U.S. PATENT DOCUMENTS

| | | |
|---|---|---|
| 7,510,096 B2 * | 3/2009 | Wang .......................... 220/4.26 |
| 7,537,119 B2 | 5/2009 | Becklin |
| 8,056,722 B2 * | 11/2011 | Lonczak et al. ............. 206/509 |
| 2006/0016812 A1 * | 1/2006 | Cheng et al. ................. 220/4.26 |
| 2007/0108080 A1 * | 5/2007 | Lonczak et al. ............. 206/509 |
| 2008/0264820 A1 * | 10/2008 | Becklin ........................ 206/508 |
| 2010/0084119 A1 | 4/2010 | Becklin |

\* cited by examiner

LATCH SYSTEM FOR CONTAINERS

FIELD OF THE INVENTION

This invention relates to a latching system for stackable containers and, more specifically, to a latching system to prevent accidental separation of adjacent stackable containers.

BACKGROUND OF THE INVENTION

Various types of containers, which may take the form of transit containers, rack-mount containers, tote containers or another type of container, are often utilized to receive and support delicate cargo such as, but not limited to, electronic, computer, optical and other types of equipment. These containers are often used in military and commercial environments and may be handled by persons, loading equipment, or both during transit and at other times. At least some of these containers have been designed to be stackable, and thus they include stacking elements or features arranged in a desired pattern. However, many of these containers may be of different types, sizes, models and versions, and thus have different stacking patterns that either do not permit the containers to be stacked together or that reduce the effectiveness, stability and/or efficiency of the containers when they are stacked together. By way of example, one company that manufactures containers having different stacking patterns is ECS Composites, Inc. out of Grants Pass, Oreg.

A variety of containers with stackability patterns include, but are not necessarily limited to, the following containers described in U.S. Pat. No. 6,457,599 to Apps et al.; U.S. Pat. No. 6,237,758 to Hsu; U.S. Pat. No. 6,186,345 to Robertson; U.S. Pat. No. 6,085,467 to Packrall et al.; U.S. Pat. No. 5,769,230 to Koefelda; U.S. Pat. No. 5,203,494 to Blomfield; and U.S. Pat. No. 4,655,360 to Juhanson.

SUMMARY OF THE INVENTION

Containers, such as transit containers, rack-mount containers, tote containers or other types of containers often include stacking patterns located on some portion of the container, for example the top and bottom surface or on the lid surfaces. Whether the containers stacked onto each other have the same stacking pattern or different stacking patterns, it may be desirable to augment the vertical stability of the stacked cases using a latching system according to an embodiment of the present invention. One purpose of such a latching system may be to connect two or more containers that have been vertically stacked so as to prevent accidental separation.

In one embodiment of the present invention, a latch system for stacked containers includes a plurality of bosses coupled to each of an upper container and a lower container, the upper container stackable on top of the lower container, the plurality of bosses including a pivot boss and a latch boss; and a latch mechanism having a pivot end portion and a latch end portion, the pivot end portion having an opening sized to receive the pivot boss of one of the containers and rotate relative thereto, the latch end portion configured to biasly engage the latch boss of the other container.

In another embodiment of the present invention, a container system includes a first container having at least a pivot boss and a storage boss separated by a latch distance; a second container stackable with respect to the first container, the second container having a latch boss; and a latch mechanism having a pivot end portion and a latch end portion, the pivot end portion configured to receive the pivot boss, the latch end portion configured to biasly and selectively engage the storage boss of the first container or the latch boss of the second container when the latch mechanism is rotated about the pivot boss.

In yet another embodiment of the present invention, a latch system for stacked containers includes a boss cap having a body coupled to an outstanding flange, the boss cap engagable with a boss extending from one of the stacked containers; and a latch mechanism having a pivot end portion, a flexible mid portion and a latch end portion, the pivot end portion having an opening sized to receive the body of the boss cap while retained by operation of the outstanding flange proximate the one of the stacked containers, the latch end portion rotatable about the boss cap to be either in a stored configuration with the one of the stacked containers or in a latching configuration with another of the stacked containers.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
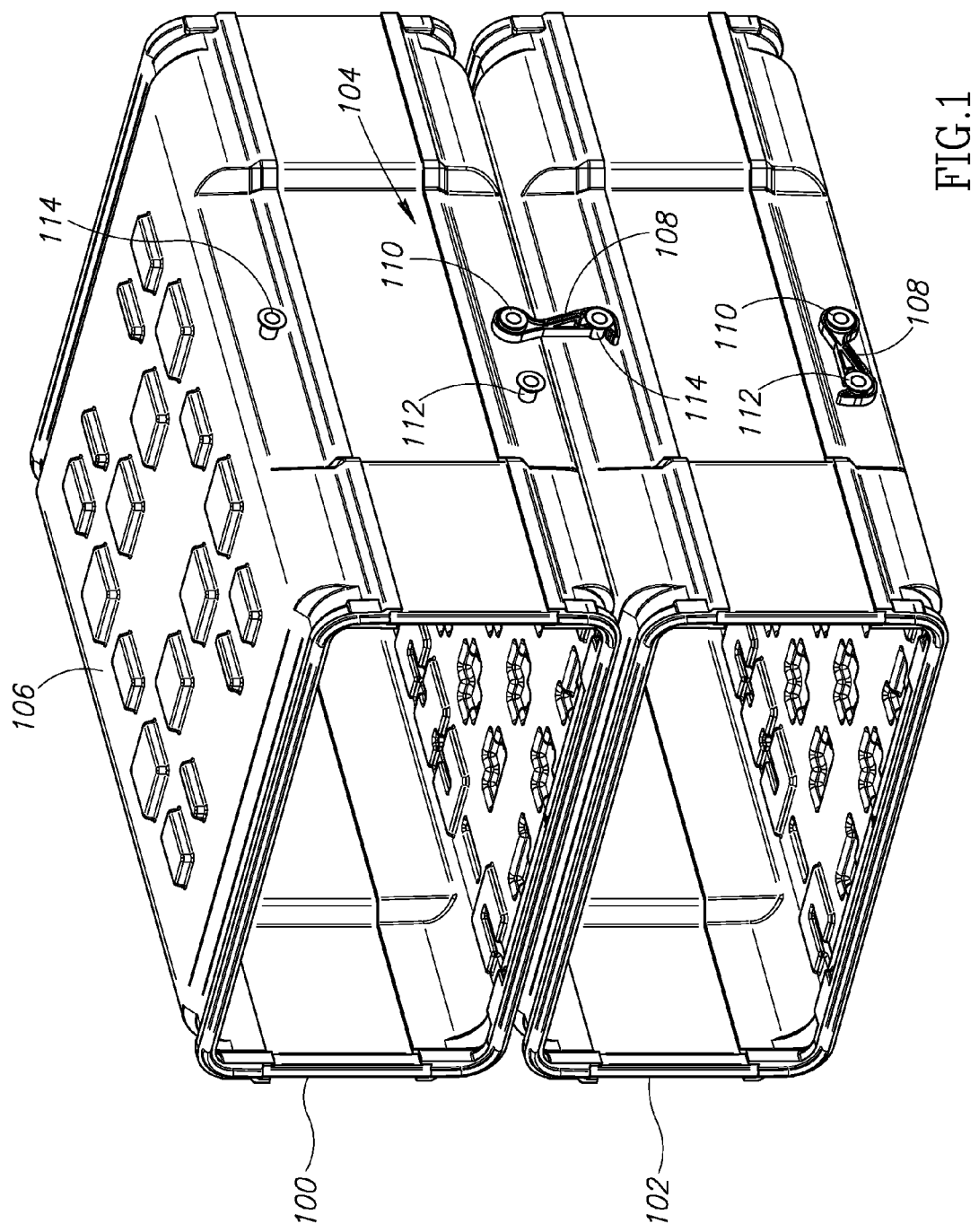
FIG. 1 is a perspective view of two stacked containers having a latch system according to an embodiment of the present invention.

FIG. 1 shows containers 100, 102 secured together with a latch system 104. The containers 100, 102 may take the form of stackable containers having stacking patterns 106 such as the containers described in U.S. Pat. No. 7,537,119; and U.S. Patent Publication Nos. 2008/0264820 and 2010/0084119. The latch system 104 includes a latch mechanism 108, a pivot boss 110, a storage boss 112 and a latch boss 114. In the illustrated embodiment, the upper latch mechanism 108 is shown in an operational configuration to secure upper container 100 to lower container 102 while the lower latch mechanism 108 is shown in a stored configuration. In one embodiment, the latch mechanism prevents accidental separation of the containers 100, 102. In one embodiment, the latching system 104 is sufficiently light weight as to prevent separation, but not robust enough to secure the containers 100, 102 during transportation. In another embodiment, the latching system 104 and the regions around the bosses may be reinforced or otherwise strengthened to provide some level of attachment security during transportation.

Figure 2A:
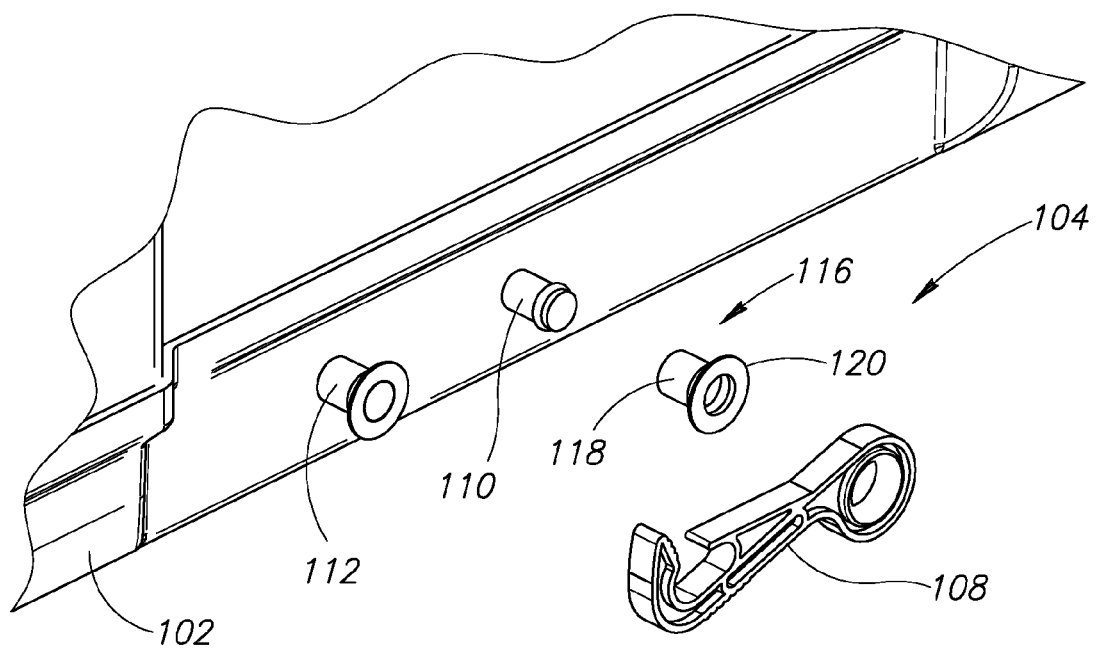
FIG. 2A is a partial, exploded, perspective view of a pivot boss, a storage boss, a boss cap and a latch mechanism of the latch system of FIG. 1 according to an embodiment of the present invention.
Figure 2B:
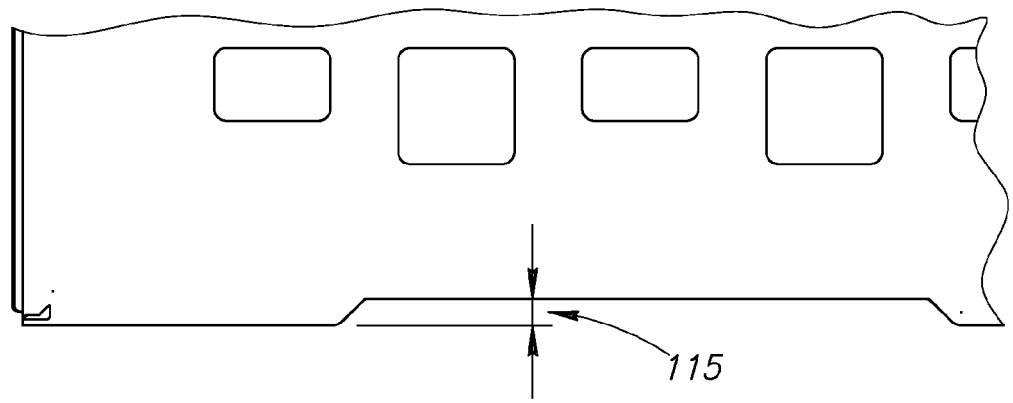
FIG. 2B is a partial, top plan view of the stacked containers of FIG. 1 showing a setback distance of the containers according to an embodiment of the present invention.

FIG. 2A shows the bosses 110, 112 extending from the container 102. The bosses 110, 112 may be identical or substantially similar to the latch boss 114 (FIG. 1). The bosses 110, 112, 114 may take the form of posts and be integrally molded with the container 102. Alternatively, any of the bosses may be non-integral with the container so they may be removed and replaced in the event they are broken, damaged, worn or whether they are being up-sized or down-sized to work with a different sized latch mechanism. By way of example, FIG. 2B shows that preferably a maximum length of each boss may be about equal to or less than a setback distance 115 formed in the container 102.

Figure 2C:
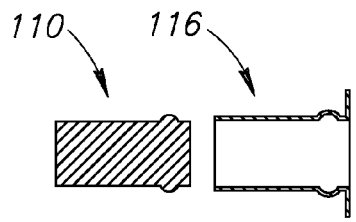
FIG. 2C is a cross-sectional view of a boss and a boss cap of a latch system according to an embodiment of the present invention.

Boss caps 116 may be positioned over one or more of the bosses 110, 112 or 114, if desired. The boss caps 116 may be sized to be friction fit onto the bosses, they may be bonded to the bosses, fastened to the bosses or otherwise attached such as by way of a cam-type or detent-type interference fit as shown in FIG. 2C. The boss cap 116 may include a body 118 and an outstanding flange 120 coupled to the body 118. The outstanding flange 120 operates to capture the latch mechanism 108 on the body 118 of the boss cap 116 and maintain the latch mechanism 108 proximate to the respective container. The boss caps 116 may be made from plastic, composite material or metal, and for the latter are preferably coated to facilitate rotation of the latch mechanism 108 and minimize wear.

Figures 3A, 3B:
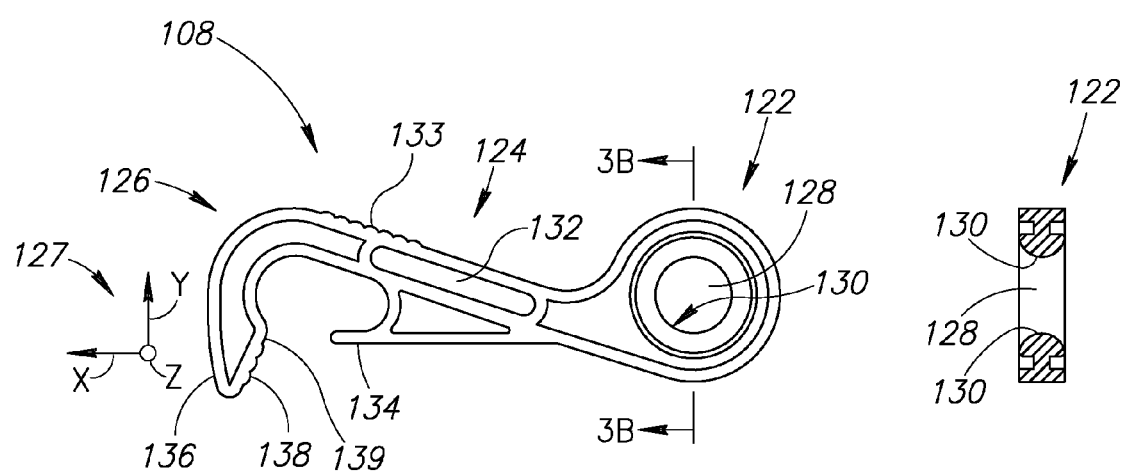
FIG. 3A is a side elevational view of the latch mechanism of FIG. 1 according to an embodiment of the present invention.
FIG. 3B is a cross-sectional view of the latch mechanism of FIG. 3A taken along line 3B-3B of FIG. 3A according to an embodiment of the present invention.

FIGS. 3A and 3B show the latch mechanism 108 having a pivot end portion 122, a flexible mid portion 124, which may be oriented like and function as an off-axis connecting beam, and a latch end portion 126. For purposes of this description, the term "off-axis" generally refers an axis that is non-parallel to any of the axes of the orthogonal axis system 127 labeled as X, Y and Z, which in turn may be defined by the pivot end portion. The orthogonal axis system 127 is illustrated off to the left side of FIG. 3A only for purposes of clarity, but otherwise may be superimposed onto the pivot end portion 122. The pivot end portion 122, illustrated in cross section in FIG. 3B, may take the form of a lug having a rounded inner diameter 130 that defines an opening 128 sized to pivot about the pivot boss 110 (FIG. 2A) and optionally sized to pivot about a boss cap 116 (FIG. 2A) that may be placed onto the pivot boss 110. The rounded inner diameter 130 provides the ability for the latch mechanism 108 to be rotated in-plane (e.g., approximately parallel to a vertical surface of the container) and out-of-plane (e.g., outward away from the container). By way of example, the in-plane rotation may be employed just as the latch mechanism 108 moves into a storage configuration or a latch configuration, whereas the out-of-plane rotation may be employed to clear the storage and latch bosses 112, 114, respectively, as needed.

In the illustrated embodiment, the flexible mid potion 124 includes an elongated slot 132, which allows the latch mechanism 108 to accommodate engagement lengths between bosses that may vary for different reasons (e.g., thermal deformation of the cases, loading of the cases, tolerances, etc.). Further, the slot 132 may allow the latch mechanism 108 to have more flexibility when latching and unlatching. In one embodiment, the flexible mid portion 124 includes gripping bumps or ridges 133 to facilitate engagement of the latch mechanism 108 under cold, damp or other challenging conditions. The ridges 133 may also provide a visual cue for interaction points during operation of the latch mechanism 108.

A retainer tab 134 preferably extends from approximately the flexible mid portion 124 and cooperates with the latch end portion 126 to produce interference with either the storage boss 112 or the latch boss 114 depending on the position of the latch mechanism 108. It is appreciated that if boss caps 116 are used then the retainer tab 134 may be sized to provide interference with the boss cap. The retainer tab operates to prevent accidental or undesired unlatching of the latch mechanism 108.

The latch end portion 126 preferably includes a thumb lever 136 extending in a cantilevered manner from the flexible mid portion 124. The thumb lever 136 provides a levered means for resiliently bending the latch mechanism 108 when unlatching (e.g., disengaging) the latch end portion 126 from either the storage boss 112 or latch boss 114. The thumb lever 136 includes a lead-in protuberance or ramp 139 that provides a wedged means for resiliently bending the latch mechanism 108 when latching (e.g., engaging) the latch end portion 126 with either the storage boss 112 or latch boss 114. The thumb lever 136 may also include gripping bumps or ridges 138 located to not interfere with the lead-in ramp and to facilitate pushing of the thumb lever 136, especially during cold, damp, tight fit or other challenging conditions. Similar to the ridges 133, the bumps 138 may provide a visual cue for interaction points during operation of the latch mechanism 108

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A latch system for stacked containers comprising:
   a plurality of bosses coupled to each of an upper container and a lower container, the upper container stackable on top of the lower container, the plurality of bosses including a pivot boss and a storage boss affixed to a side of each of the upper and lower containers each offset from a lower surface of each of the upper and lower containers by a same first distance and separated from one another by a second distance, the plurality of bosses further including a latch boss coupled to the side of each of the upper and lower containers and vertically aligned with the pivot boss of each of the upper and lower containers; and
   a latch mechanism having a pivot end portion and a latch end portion, the pivot end portion having an opening sized to receive and pivotally affixed to the pivot boss of the upper container and rotate relative thereto, the latch end portion configured to biasly engage the latch boss of the lower container and the storage boss of the upper container,
   wherein the upper container is stacked on the lower container such that the pivot boss of the upper container and the latch boss of the lower container are separated by the second distance.

2. The latch system of claim 1, wherein the plurality of bosses includes a storage boss.

3. The latch system of claim 1, wherein the latch mechanism includes a flexible mid portion that extends between the pivot end portion and the latch end portion.

4. The latch system of claim 3, wherein the flexible mid portion is an off-axis connecting beam with an elongated slot extending therethrough.

5. The latch system of claim 1, wherein the latch mechanism includes a retainer tab operable to biasly maintain the latch end portion of the latch mechanism in a latched configuration with the latch boss.

6. The latch system of claim 5, wherein the latch end portion includes a cantilevered portion resiliently bendable for selectively engaging and disengaging the latch end portion with the latch boss.

7. The latch system of claim 1, wherein the pivot end portion includes a rounded inner diameter configured to permit in-plane and out-of-plane rotation of the latch mechanism relative to the pivot boss.

8. The latch system of claim 1, further comprising a boss cap having a body coupled to an outstanding flange, the body engagable with at least the pivot boss.

9. The latch system of claim 8, wherein the body is sized to be received in the opening of the pivot end portion of the latch mechanism and the outstanding flange capturably maintains the latch mechanism on the pivot boss.

10. The latch system of claim 1, wherein the boss cap is fastened to the pivot boss.

11. The latch system of claim 1, further comprising another boss cap engagable with at least the latch boss.

12. A container system comprising:
 a first container having at least a pivot boss and a storage boss each affixed to a side of the first container and separated by a latch distance;
 a second container stacked with respect to the first container, the second container having a latch boss affixed to a side of the second container; and
 a latch mechanism having a pivot end portion and a latch end portion, the pivot end portion configured to receive the pivot boss and being pivotally affixed to the pivot boss, the latch end portion configured to biasly and selectively engage the storage boss of the first container or the latch boss of the second container when the latch mechanism is rotated about the pivot boss and the storage boss of the first container,
 wherein the pivot boss of the first container and the latch boss of the second container are separated by the latch distance.

13. The container system of claim 12, wherein the first container is stackable on top of the second container.

14. The container system of claim 12, wherein the first container includes a latch boss.

15. The container system of claim 12, wherein the second container includes a pivot boss and a storage boss.

16. The container system of claim 12, wherein each container includes a setback region from which the respective bosses extend from, and where a depth of the setback region exceeds a length of the longest boss.

17. The container system of claim 12, wherein each container includes a setback region from which the respective bosses extend from, and where a depth of the setback region is approximately flush with a length of the longest boss.

* * * * *